Aug. 18, 1931.  W. H. SCHIMPF  1,819,573
METHOD OF AND APPARATUS FOR TRANSLATING ENERGY
Filed Dec. 9, 1926  3 Sheets-Sheet 1
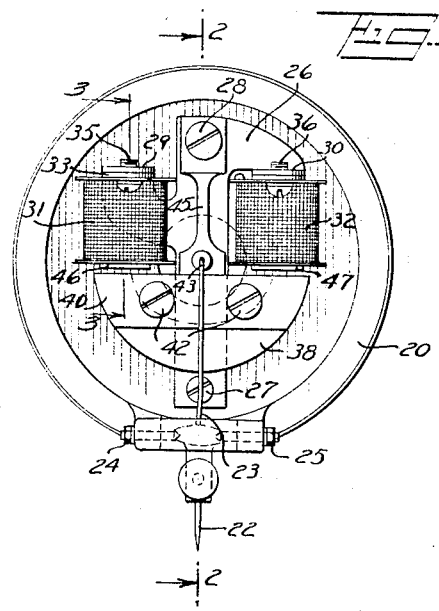
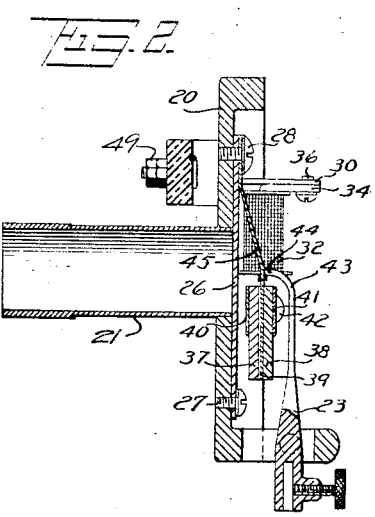
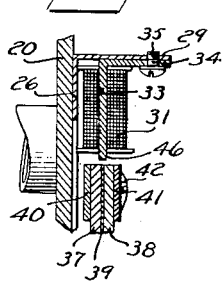
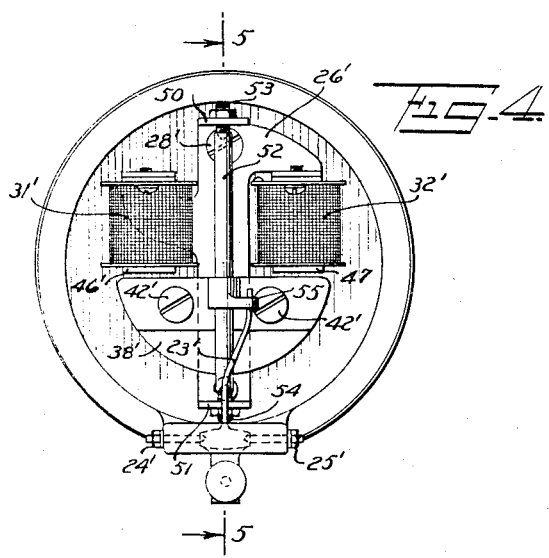
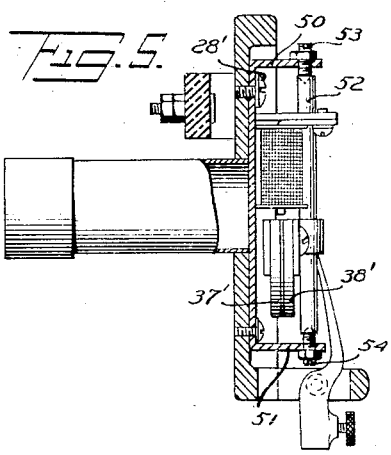
INVENTOR
Walter H Schimpf
BY
John M. Cole
ATTORNEY

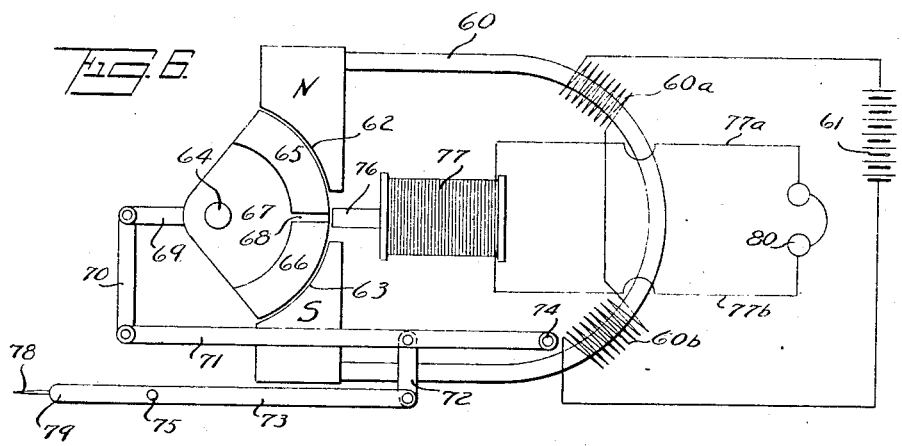

Aug. 18, 1931.    W. H. SCHIMPF    1,819,573
METHOD OF AND APPARATUS FOR TRANSLATING ENERGY
Filed Dec. 9, 1926    3 Sheets-Sheet 3
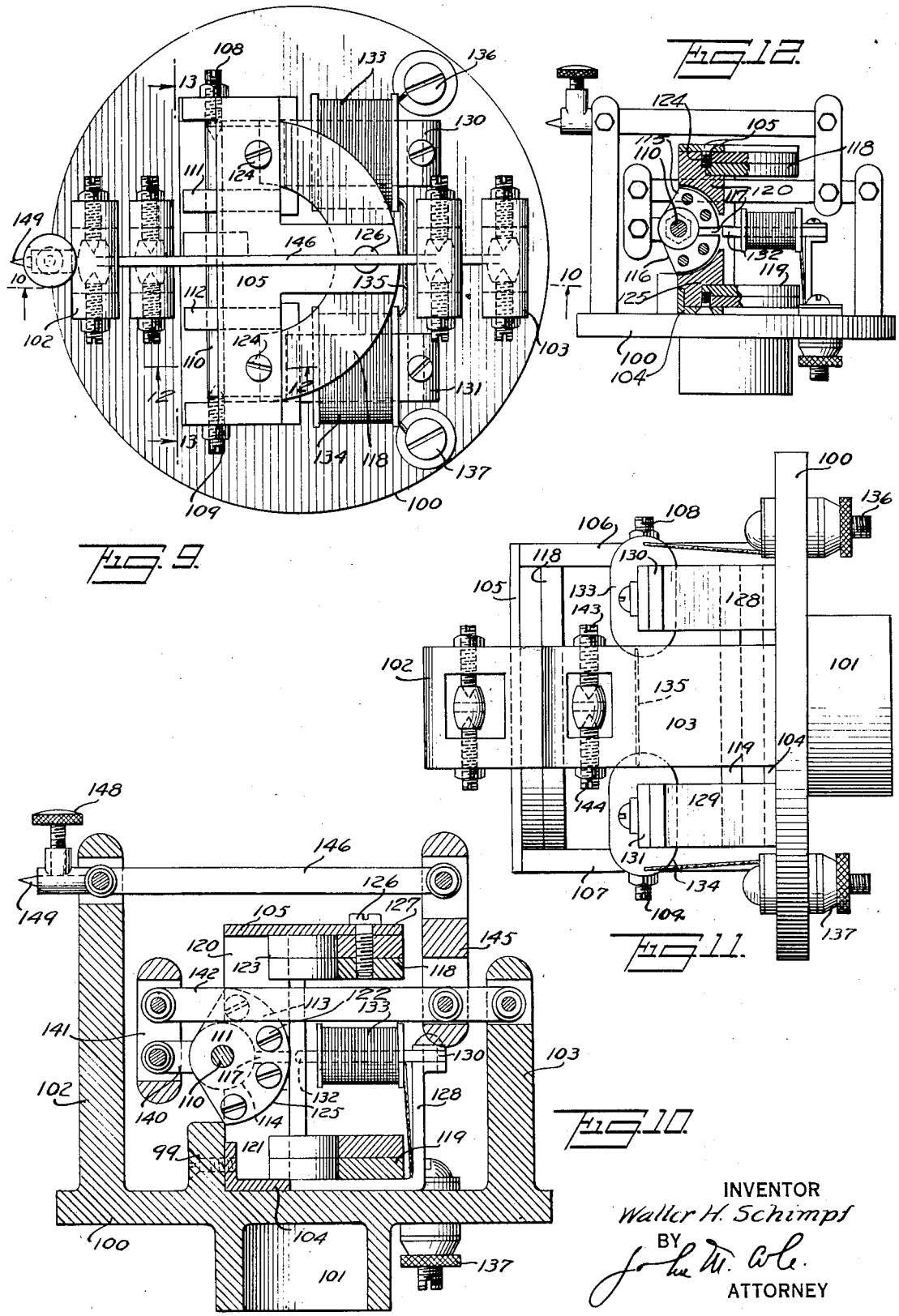

Patented Aug. 18, 1931

1,819,573

UNITED STATES PATENT OFFICE

WALTER H. SCHIMPF, OF TOLEDO, OHIO, ASSIGNOR OF ONE-FOURTH TO JOHN M. COLE, OF NEW YORK, N. Y.

METHOD OF AND APPARATUS FOR TRANSLATING ENERGY

Application filed December 9, 1926. Serial No. 153,596.

The present invention relates to methods of and apparatus for translating energy, and more particularly relates to the translating of minute vibratory movements into electrical energy, and vice versa.

According to the present invention small mechanical movements such as the vibration of a needle under the control of a sound record are transmitted to a movable magnetic, or magnetizable part of a magnetic system including permanent magnets or electromagnets. These magnetic parts are movably carried adjacent a soft iron core carried in a stationary coil wherein undulatory currents proportional in value to the vibratory movements of the needle are generated. The electric current so produced is a direct current and may be detected by head phones or may be amplified through any of the audio frequency amplification circuits in ordinary use. Substantially the same armature, magnetic system and coil may be used to produce mechanical vibration where suitable electric current is supplied to the coil from an outside source, such as a radio receiving set, and this mechanical vibration may be amplified mechanically to operate a loud speaker or reproducer or a cutting stylus for producing sound records.

According to the preferred method of carrying out the invention, two stationary coils are used, each coil being wound about a soft iron core, magnetically independent of the other core. The movable magnetic parts, whether permanent magnets, electromagnets or armatures magnetized by such magnets, are so arranged that north and south poles are close to one another in pairs and each pair of these pairs of poles is placed close to an end of the iron core of one of the stationary coils. The movable magnetic parts equally attract the iron core and tend to come to a position of magnetic balance. They magnetize the adjacent end of the core, most of the flux passing across the end of the core, while the amount of flux which passes through the core lengthwise is practically nil. As soon, however, as the magnetic balance is disturbed by a change in the position of the movable parts, the influence of one or the other of the magnetic poles will predominate and a substantial magnetic flux will enter the core and pass through it lengthwise. The rate of change of this flux will depend upon the speed at which the parts are moved and the amount of movement.

Sound records are so prepared that there is a predetermined depth of cut at which no sound is produced. The operation of the cutting stylus is to cut beyond this depth in proportion to the sound waves being recorded. When the record is being played, the needle follows the cut groove and vibrates to and fro from a predetermined zero position of no sound. When the needle is operatively connected to movable magnetized parts, above referred to, and the parts are properly balanced, the magnetic forces and mechanical forces will come to some balance inducing a very small flux in the cores of the stationary coils. When the record is played, these magnetized parts will be vibrated to and fro from the predetermined position and will vary the flux in these cores in the same manner, and this variation in flux will generate currents in the coils proportional to the rate of change of flux. As these cores normally have practically no flux in them, the varying flux is not imposed on saturated iron and no distortion of current wave will result as would be the case if the varying flux were imposed on a saturated or nearly saturated magnetic circuit.

It is therefore an object of the present invention to provide an apparatus which can be operated by an energy source, such as a moving sound record, and produce audio frequency currents of corresponding character, or which can be operated by a powerful audio frequency current to reproduce sound or cut sound records.

Other and further objects of the invention will appear as the description proceeds.

The accompanying drawings diagrammatically show convenient forms of apparatus for carrying out the desired methods and the details of construction of several of the many possible embodiments in which the invention may take form, it being understood that the drawings are illustrative of the invention rather than limiting the same.

In these drawings:

Figure 1 is an elevational view of one form of energy translating device for generating currents proportional to the movement of a phonograph needle, the magnets being bodily vibrated transversely of the end faces of the cores in the stationary coils;

Figure 2 is a vertical section taken on the line 2—2 of Figure 1;

Figure 3 is a vertical sectional view taken on the line 3—3 of Figure 1;

Figure 4 is a view similar to Figure 1 showing a form of the invention in which the magnets are oscillated back and forth across the faces of the cores in the stationary coils;

Figure 5 is a vertical sectional view taken on the line 5—5 of Figure 4.

Figure 6 is a diagrammatic view illustrating another form of apparatus for producing electrical energy from mechanical energy, showing the detecting of the electrical energy by a telephone receiver;

Figure 7 is a circuit diagram for amplifying the current produced in the apparatus of Figures 1 to 6;

Figure 8 is a diagrammatic view illustrating a form of apparatus for operating the diaphragm of a loud speaker or reproducer or a cutting stylus;

Figure 9 is a top plan view showing structural details of an apparatus such as is diagrammatically shown in Figure 6;

Figure 10 is a sectional view on the line 10—10 of Figures 9 and 11;

Figure 11 is an end elevational view taken from the right of Figure 9;

Figure 12 is a side elevational view with parts in section along the line 12—12 of Figure 9, and Figure 13 is a sectional view on the line 13—13 of Figure 9.

According to the form of the invention shown in Figures 1, 2 and 3, a flat disk-like supporting member 20 is provided with a rearwardly extending tubular extension 21 to facilitate supporting these parts in the free end of a swinging tone arm for a phonograph. A phonograph needle 22 is removably carried in the free end of a lever 23 pivotally mounted on adjustable screws 24 and 25. These parts are so arranged that the needle 22 may be disposed in the groove of a phonograph record, while the record is being played, the vibration of the lever being controlled by the sound record.

A sub-frame 26 of non-magnetic material is mounted on the front face of the supporting member 20, screws 27 and 28 being used to hold the frame in place. This frame has a pair of forwardly extending coil supporting arms 29 and 30. These arms support coils 31 and 32. In the form here shown, these coils have L-shaped cores 33 whose upper ends are bent forwardly as indicated at 34. Screws 35 and 36 fasten the cores to the core supporting arms 29 and 30. These coils are wound by a large number of turns of fine wire. The cores 33 are each composed of a single piece of soft iron.

As here shown, a pair of semi-circular permanent magnets 37 and 38 are separated by a brass lamination 39 and are fastened together by clamping plates 40 and 41 and screws 42.

The upper end 43 of the stylus lever 23 is attached to the magnet in any convenient manner. As here shown, the upper end of the lever is bent inwardly as indicated at 44 and is fastened to a leaf spring 45. The lower end of the spring 45 is attached to the spacer 39 while the upper end of the spring 45 is engaged under the head of the screw 28. The magnets 37 and 38 are reversed relative to one another so that the north pole of one magnet is adjacent the south pole of the other and the magnet system is mounted so that these pairs of poles are brought close to the exposed ends 46 and 47 of the cores 33. The support for the magnet system is such that these magnets cannot actually touch the ends of the cores.

The parts are so proportioned and balanced mechanically that the pole faces of the magnets 37 and 38 are brought substantially equidistant from the pole faces 46 and 47 of the stationary cores. In this way, the magnetism induced in the cores by the pairs of north and south poles will be concentrated at the ends of the cores. The stationary cores and the movable magnets will come to a position at which the magnetic forces and the mechanical forces are balanced, and, owing to the closeness of the north and south poles in the permanent magnets, there will be practically no flux passing lengthwise of the cores 33. In other words, the field induced by the close pair of poles will be very much restricted or closed up and practically all of the flux induced in the stationary cores will be transverse of the ends of these cores. There is practically no flux passing lengthwise of the core. Inasmuch as the two cores are magnetically independent of one another, there is no cross action or influence from one core to the other.

When the parts are mounted in the manner above described and the needle 22 is placed on a phonograph sound record in the record plate as usual, the stylus arm 23 will be vibrated by the record. This vibration will cause a rapid to-and fro-movement of the magnetic poles back and forth across the faces of the cores 33. This movement from the position of balance will disturb the magnetic flux in the cores and the effect of one or the other of the magnet poles will predominate, thereby inducing a stronger pole in the adjacent end of the core. This will result in a flux extending lengthwise of the core. As this flux will vary according to the movement of the magnet, there will be generated in the coil surrounding this core, a current proportional in value to the charge of flux in the core. As the core is normally substantially free from any flux, it results that the flux induced in the core is directly proportional to the movement of the magnets. The iron is worked at such a low intensity, that no saturation exists in the iron, and hence the reproduction is more faithful than would be the case if the iron were saturated.

The coils 30 and 31 are connected in series by a wire 48 so that the current generated in one coil may be added to the current generated by the other coil and the two coils are connected to binding posts 49 carried on the rear face of the support 20. The current generated in the coils 31 and 32 may be detected by a telephone receiver connected across these binding posts.

According to the form of invention illustrated in Figures 4 and 5, the coils 31' and 32' are supported from the sub-frame 26' in the same manner as the coils 31 and 32, shown in Figures 1, 2 and 3. The magnets 37' and 38' are fastened together in the same manner as shown in Figures 1 and 2. According to the form of invention here shown, however, the sub-frame 26' is bent forwardly as indicated at 50 and 51 and a shaft 52 is pivoted in adjustable needle point bearings 53 and 54. The magnets 37' and 38' are supported from the shaft 52 and are held adjacent the ends 46' of the cores for the coils. The stylus arm 23' is passed through a hole in an arm 55 carried by the shaft 52 so that the oscillatory movement of the stylus arm will rock the shaft 52 back and forth in its bearings. In this manner the pairs of poles provided by the two magnets are vibrated back and forth past the ends of the iron cores. Currents will be induced in the coils 31' and 32' in the same manner as above described and the coils are connected together so that the currents so generated will be added. This form of construction permits adjusting the air gap between the magnets and the cores by moving the shaft 52 back and forth by adjusting the needle points. The arm 55 can slide along the upper portion of the stylus lever 23'.

According to the illustration shown diagrammatically in Figure 6, a magnet 60, which may be either a permanent magnet or an electromagnet with coils 60a and 60b energized from a battery 61, has north and south pole pieces or pole tips having arcuate faces as indicated at 62 and 63. A shaft 64 is mounted at the center of curvature of the pole faces and arcuate armature members 65 and 66 are mounted on a non-magnetic support 67, carried by this shaft. This non-magnetic support and the two pole pieces provide an armature adapted to move in the magnetic field. The pole faces 62 and 63 and the armature members 65 and 66 are separated from one another by a narrow gap 68. The shaft 64 is connected with an arm 69 which in turn is connected to a system of links indicated at 70, 71, 72 and 73. The links 71 and 73, are mounted on fixed pivots indicated at 74 and 75, respectively, so that the links may be vibrated causing the armature members to rock back and forth. The pole pieces act on the armature members to produce a concentrated magnet couple at this air gap. A soft iron core 76 preferably similar to those previously described, is mounted so as to be very close to the movable armature carrying the armature members 65 and 66 and a coil 77 having many turns of fine wire is wound about this soft iron core 76.

The magnet 60, through its north and south poles as indicated at N and S will induce strong magnetic poles S' and N', in the armature members 65 and 66 respectively. As previously described these closely spaced poles will induce some magnetic flux in the soft iron core member 76.

The movable parts including the links and armature members will come into some definite predetermined position of rest by reason of the balancing of the magnetic and mechanical forces. When these parts are in balance, the poles N' and S' will be opposite the end of the soft iron core 76 and substantially no flux will pass lengthwise through the core 76. So long as the parts are stationary, there will be no change in the amount of flux flowing through the soft iron core 76. The magnetic system will be completely balanced and the flux constant throughout. If the system of links is moved, as for example by a needle 78 on the end 79 of the link 73, the armature members 65 and 66 will be moved one way or the other from neutral position imposed by the magnetic balance. This disturbance of the magnetic system will result in a change in the amount of flux passing through the core 76 and this change in flux will induce an electric current in the coil 77. This induced current is a direct current of varying value and may be detected by a telephone receiver as indicated at 80.

Instead of detecting the current generated in the coil 77 by telephone receivers indicated at 80, the wires 77a and 77b may be connected to an audio frequency amplification circuit, such as is found in radio receivers. A circuit suitable for such amplification may include two vacuum tubes 81 and 82 with associated A, B and C batteries, transformer and loud speaker or reproducer, as indicated in Figure 7.

Reference is now made to the embodiment of the invention illustrated in Figures 9 to 13, inclusive. A supporting base 100 carries the fixed and movable parts of the device. Where the device is to be supported on the end of the swinging phonograph tone arm, the support 100 may be provided with a tubular extension 101 adapted to fit the end of the tone arm. The supporting base 100, as here shown, is provided with posts 102 and 103 which provide fixed supports for links corresponding with the links 71 and 73 of Figure 6.

As here shown, a sub-frame mounted on the supporting base supports the magnets, the coils and the movable parts of the magnet system. This sub-frame includes a bottom member 104, a top member 105 and two side members 106 and 107. The side members 106 and 107 carry inwardly directed adjustable bearing pins 108 and 109 which provide a pivotal mounting for a shaft 110 corresponding to shaft 64 of Figure 6. This shaft 110 carries sectors 111 and 112 of non-magnetic material, and soft iron armature members 113 and 114, and 115 and 116, arranged in pairs, are mounted by screws as indicated at 122. These armature members correspond with the armature members 65 and 66 in Figure 6. They are separated from one another by a narrow air gap indicated at 117.

According to the embodiment of the invention being described, two sets of permanent magnets are used, each set preferably consisting of two magnets. The upper magnets are indicated at 118 and the lower magnets at 119. The ends of the permanent magnets are provided with pole pieces or pole tips, two of which are indicated at 120 and 121 in Figure 10. These pole pieces are cut back as indicated at 123 to receive the ends of the magnets and screws 124 (Figure 9) clamp the magnet tips in place. The pole pieces are preferably made of soft iron and are shaped as indicated at 125 to receive the armature members 113, 114, 115 and 116. The clearance between these parts is made very small. The central part of the upper permanent magnet 118 may be fastened in place by screw 126 which passes through a rearwardly extending portion 127 of the top piece 105 of the sub-frame. By using the flat permanent magnets, such as are here shown, two sets of north and south poles will be provided at either side of the device.

The bottom sub-frame member 104, fastened to the supporting base by screws 99 as here shown is provided with two rearwardly extending arms 128 and 129 to provide supports for forwardly extending cores 130 and 131. Each of these cores has a free end, as indicated at 132, which is adjacent the pair of movable armature members. Fine wire coils 133 and 134 surround these cores and these coils are connected in series by a wire 135 and are interconnected with binding posts 136 and 137 so that the currents generated in the coils are added and the instrument may be connected to a suitable detector.

The shaft 110 also carries a short operating lever 140 to which is pivotally mounted a short link 141. This link is connected with a lever 142 mounted on pins 143 and 144 carried in the portion 103 of the support 100. The link 143 is also pivotally connected to a short link 145 which is in turn connected with a lever 145 mounted in the projection 102 of the support 100. The free end of the lever 146 may be provided with a coupling device 148 for mounting the phonograph needle 149. The bearings between these levers and links and the supports for the same are preferably made to have as little friction as possible and a convenient form of such a bearing is shown which is capable of accurate adjustment and which will take the load in whatever position that the device may be placed. It is, of course understood that the position of the device will be at an angle to the vertical axis customary in the reproducers on phonograph tone arms.

When the device is mounted on the tone arm of a phonograph and the needle 149 placed in the groove of a phonograph record and the same operated, it will be understood that the lever system will be mechanically actuated by the phonograph record. This will cause a very rapid vibration of the shaft 110 and movable armature members carried thereby. This vibration conforms to the sound record. The rapid movement of the armature members 113 and 114, and 115 and 116 before the corresponding cores 130 and 131 will cause the setting up of a varying flux in these cores in the manner above described. The variations of this flux corresponds with the movements of the armature, and it will generate a direct current in the coils 133 and 134 which can be detected either by a telephone receiver, as above described, or amplified in the radio amplification circuits of a radio receiving set, and then reproduced by a loud speaker.

While the device has been described more particularly for use with prepared sound records, it is of course obvious that one could operate the movable parts by a diaphragm responsive to vibrations in the air.

Instead of accomplishing a translation of mechanical energy into electrical energy by the methods and apparatus described in Figures 1 to 6 and 9 to 13 inclusive, one may, preferably with a slightly modified apparatus translate mechanical energy into electrical energy as diagrammatically illustrated in Figure 8. Structurally, this apparatus is much the same as that shown in Figure 6, and the same reference characters, with a prime (') added, are used so far as possible. The link 69' carried by the shaft 64' is, as here shown, connected with a different type of lever system so that the shaft movements may be amplified. Such a lever system may include links 150, 151, 152 and 153, the links 151 and 153 being pivoted at 154 and 155 in the supporting frame 156. The free end 157 of the link 153 may be connected to a diaphragm 158 of a loud speaker of any of the conventional types or may be connected to a record cutting stylus.

The apparatus shown in Figure 8 will come into a certain position of magnetic and mechanical balance in the same manner as the apparatus described in Figure 6. When, however, current, such as received from the audio frequency circuits of the radio receiver, is passed through the coil 77', this current will induce a varying magnetic flux in the core 76'. This will result in upsetting or destroying the magnetic balance so that an induced pole at the end of the core 76' will attract the adjacent armature member and bring about a corresponding movement in the system of links. The amount of movement of the system of links will be directed proportionally to the variation of current in the coil 76' and in this manner the diaphragm 158 may be actuated to reproduce the sound, or the cutting stylus operated to make a sound record. The reproduction will be very exact on account of the working of the iron at very low magnetic intensity.

It is obvious that the invention may be embodied in many forms and constructions, and I wish it to be understood that the particular forms shown are but a few of many forms. Various modifications and changes being possible, I do not limit myself in any way with respect thereto.

What is claimed is:

1. In an energy translating device, a magnet system including movably mounted parts arranged in fixed relation relative to one another and of opposite polarity, said parts being separated by a narrow gap, a coil, and a soft iron core in said coil, said core having an end projecting into the field emanating from said parts and separated from the same by a narrow air gap and acting on said parts to cause them to assume a normal position in which substantially no magnetic flux is induced lengthwise of the core, whereby flux variation in said core is a combined function of current in the coil and movement of said parts.

2. In an energy translating device, a magnet system including a fixed permanent magnet and pivotally mounted armature members arranged in fixed relation relative to one another and having induced poles of opposite polarity, said armature members being separated by a narrow gap, a coil, and a soft iron core in said coil, said core having an end projecting into the field emanating from said armature members and separated from the same by a narrow air gap and acting on said armature members to cause them to assume a normal position in which substantially no magnetic flux is induced lengthwise of the core, whereby flux variation in said core is a combined function of current in the coil and movement of said armature members.

3. In an energy translating device, a magnet system including pairs of fixed permanent magnets in fixed relation relative to one another, pairs of armature members, the members of each pair being separated by a narrow gap, two coils, and a soft iron core in each coil, each core having an end projecting into the field emanating from one of the pairs of armature members and separated from the same by a narrow air gap and acting on said armature members to cause them to assume a normal position in which substantially no magnetic flux is induced lengthwise of the corresponding core, whereby flux variation in said core is a combined function of current in the corresponding coil and movement of said armature members.

4. In an energy translating device, a fixed coil, a fixed soft iron core in the coil, a magnetic system including parts arranged in fixed relation relative to one another and of opposite polarity, said parts being separated by a narrow gap, mounting means for said parts to space them substantially equidistant from an end face of the iron core whereby the effect of neither pole predominates and substantially no flux is induced lengthwise of the core, and means for vibrating said parts across the face of the iron core to induce a varying flux lengthwise of the core whereby an undulatory circuit is induced in the coil corresponding to the vibratory movement of the said parts.

5. In an energy translating device, two fixed coils, a fixed soft iron core in each coil, a magnetic system including parts arranged in pairs in fixed relation relative to one another and of opposite polarity, the parts of each pair being separated by a narrow gap, and each pair being separated from the end of the corresponding core by a narrow air gap, mounting means for said parts to space them substantially equidistant from the end faces of the iron cores whereby the effect of neither pole of a pair predominates on the adjacent core and substantially no flux is induced lengthwise of the cores, and means for vibrating said parts across the faces of the iron cores to induce a varying flux lengthwise of the cores whereby an undulatory circuit is induced in the coil corresponding to the vibratory movement of the said parts.

6. In an energy translating device, a fixed coil, a fixed soft iron core in the coil, a magnetic system including a fixed permanent magnet and pivotally mounted armature members arranged in fixed relation relative to one another and of opposite polarity, said armature members being separated by a narrow gap, mounting means for said armature members to space them substantially equidistant from an end face of the iron core whereby the effect of neither pole predominates and substantially no flux is induced lengthwise of the core, and means for vibrating said armature members across the face of the iron core to induce a varying flux lengthwise of the core whereby an undulatory circuit is induced in the coil corresponding to the vibratory movement of the said armature members.

7. In an energy translating device, two fixed coils, a fixed soft iron core in each coil, a magnetic system including pairs of fixed permanent magnets having separated poles and pairs of pivotally mounted armature members arranged opposite the unlike poles of the permanent magnets and separated by a narrow gap, mounting means for said armature members to space them substantially equidistant from the end faces of the iron cores whereby the effect of neither pole predominates and substantially no flux is induced lengthwise of the cores, and means for vibrating said armature members across the faces of the iron cores to induce varying flux lengthwise of the cores whereby an undulatory circuit is induced in the coils corresponding to the vibratory movement of the said armature members.

8. In an energy translating device, a pair of high resistance coils, a soft iron core in each coil, said cores being magnetically independent of one another, a magnetic system including movably mounted parts arranged in pairs of opposite polarity in fixed relation to one another, the parts of each pair being separated from one another by a narrow gap, each of the parts of each pair being spaced from the end of one of the adjacent cores by a narrow air gap whereby the flux induced in the cores is concentrated at the ends of the cores and substantially no flux is induced lengthwise of the cores.

9. In an energy translating device, a fixed magnet having pole tips, movable armature members adjacent each of the pole tips and held out of contact with them, the ends of the armature members being separated by a narrow gap, a coil, and an iron core in said coil, said core having an end projecting into the field emanating from the armature members and separated from the same by a narrow air gap.

10. In an energy translating device, a fixed magnet having pole tips, movable armature members adjacent each of the pole tips having pole pieces and held out of contact therewith, the ends of the armature members being separated by a narrow gap, a coil, and an iron core in said coil, said core having an end projecting into the field emanating from the armature members and separated from the same by a narrow air gap, the flux through the core being a function of the position of the armature and of the current in the coil whereby energy may be transferred from the coil to the armature or vice versa.

11. In an energy translating device, a magnet system including parts arranged in fixed relation relative to one another and of opposite polarity, movable armature members separated from said parts by a narrow gap, the ends of the armature members being separated, a coil, and a soft iron core in said coil, said core having an end projecting into the field emanating from the ends of the armature members and separated from the same by a narrow air gap.

12. In an energy translating device, a magnet system including parts arranged in fixed relation relative to one another and of opposite polarity, movable armature members separated from said parts by a narrow gap, the ends of the armature members being separated, a coil, a soft iron core in said coil, said core having an end projecting into the field emanating from the ends of the armature members and separated from the same by a narrow air gap, and a system of movement multiplying levers and links operatively connected with the armature members.

13. In an energy translating device, an arc-shaped magnet having arc-shaped pole tips, pivotally mounted armature members having arc-shaped surfaces separated from the pole tips by a narrow air gap, the ends of the armature members being separated, a coil, and an iron core in said coil, said core having an end projecting into the field emanating from the ends of the armature members and separated from the same by a narrow air gap, the ends of the armature members being movable back and forth across an end of the iron core.

14. In an energy translating device, an arc-shaped magnet having arc-shaped pole tips, pivotally mounted armature members having arc-shaped surfaces separated from the pole tips by a narrow air gap, the ends of the armature members being separated, a coil, and a soft iron core in said coil, said core having an end projecting into the field emanating from the armature members and separated from the same by a narrow air gap, the flux through the core being a function of the position of the armature and of the current in the coil whereby energy may be transferred from the coil to the armature or vice versa.

15. In an energy translating device, a permanent magnet having soft iron pole tips, soft iron movable armature members separated from the pole tips by a narrow air gap, the ends of the armature members being separated, a coil, and a soft iron core in said coil, said core having an end projecting into the field emanating from the ends of the armature members and separated from the same by a narrow air gap.

16. In an energy translating device, an arc-shaped permanent magnet having soft iron arc-shaped pole tips, pivotally mounted armature members having arc-shaped surfaces separated from the pole tips by a narrow air gap, the ends of the armature members being separated, a coil, and a soft iron core in said coil, said core having an end projecting into the field emanating from the ends of the armature members and separated from the same by a narrow air gap, the ends of the armature members being movable back and forth across the end of the iron core.

17. In an energy translating device, a support, a pair of permanent magnets mounted in the support with their unlike poles opposite one another, stationary pole tips for each of the poles of the magnets, a rockable shaft, shaft carried armature members separated from one another by a narrow gap, the pole tips and armature members being shaped to permit the movement of the armature members inside the pole tips, stationary coils, cores in the coils, the end of a core being adjacent a pair of armature members.

18. In an energy translating device, a support, a sub-frame, a shaft carried in the sub-frame, pairs of soft iron sectors carried by the shaft, the sectors of each pair being separated by a narrow gap, permanent magnets carried by the sub-frame, pole tips for the magnets, the pole tips being cut away to allow the sectors to move within the pole tips, soft iron cores carried by the sub-frame each having an end adjacent the gap between a pair of sectors, and a coil wound about each core.

19. In an energy translating device, a support, a sub-frame carried on the support, a shaft mounted in the sub-frame, a series of multiplying levers connected to the shaft and mounted in the support, a pair of permanent magnets, pole tips for the permanent magnets, the pole tips having surfaces concentric with the shaft and being arranged in pairs, pairs of armature members carried by the shaft and movable in the pole tips, the armature members of a pair being brought close together, soft iron cores mounted on the sub-frame, each having an end adjacent the space separating a pair of armature members, and a coil wound about each core, the cores being in the fields emanating from the armature members, the flux variation in the cores being a combined function of current in the coil and movement of the shaft.

20. An energy translating device having movable magnetized parts separated by a narrow gap, a coil, a stationary magnetizable core in the coil, mounting means for the magnetized parts to permit them to move back and forth across the end of the core, the parts having a normal position of balance at which substantially no flux is induced lengthwise of the core, the flux in the core being a combined function of the current in the coil and the movement of the said parts.

21. The method of producing an electric current corresponding to a sound record which comprises actuating by a sound record a pair of magnet poles across the end of an iron core about which a coil is wound, the core being substantially free from magnetic flux when the poles are in their normal position.

22. In the producing of electric currents, corresponding to sound records, the method which consists in vibrating a pair of magnet poles away from a normal position adjacent a core in a coil wherein substantially no flux is induced in the core, said vibration being in accordance with the sound record and producing a corresponding variation of flux in the core, the varying flux inducing a current in the coil.

23. The method of operating an energy translating device which consists in causing the field from movable magnetic parts to react with the end of a soft iron core having a coil wound thereon to bring the parts to a balanced position in which substantially no flux is induced lengthwise of the core, and then vibrating the parts from this position by a sound record to generate a varying flux in the core corresponding to the movement of the parts, and generating a current in the coil.

24. The method of operating an electric generator for generating currents having frequencies of the order of sound waves having a current generating coil wound about a core normally free of magnetic flux, which consists in vibrating at corresponding frequency a pair of oppositely polarized magnet poles adjacent the core to produce a flux variation in the core and generate a current in the coil corresponding with the amplitude and frequency of the magnet pole vibration.

25. The method of producing undulatory electric currents of sound wave frequency and character in a current generating coil inductively associated with a magnet core normally free of magnet flux, which consists in imparting to a pair of magnet poles a vibratory motion of sound wave frequency and character and causing said poles to induce flux in the core in direct proportion to the frequency and amplitude of the magnet pole vibration.

26. In the production of electric currents of sound wave frequency and character in a coil wound about a fixed iron core disposed within the field of vibratory armatures, the method of avoiding distortion normally due to saturation of the core, which consists in vibrating the armatures about a neutral point at which no flux is induced lengthwise of the core.

27. The method of generating undulatory currents of predetermined wave form of a frequency of the order of sound waves in a coil wound about an iron core, which consists in varying the flux in the iron core away from zero value in accordance with the desired wave form whereby the effects of magnetic saturation are minimized.

28. An electromagnetic device for the purposes herein described comprising a stationary magnet, a stationary coil wound about an iron core, a vibratory armature normally in a position to induce a minimum flux in the core and which, when moved out of normal position, changes the flux according to the amount and rate of movement, whereby a current is generated in the coil with great fidelity owing to the low magnetic flux in the core.

29. In an electromagnetic device, the combination with a stationary magnet of a needle operated armature member within the field of the magnet and adjacent an iron core carrying a coil, the parts being so located that a minimum of flux is induced in the core by the magnet when the armature member is at rest, whereby the effects of magnetic saturation is minimized and the current generated in the coil closely corresponds to the character of movement of the vibrations of the needle.

30. An energy translating device having a movable magnetized part separated from the energizing magnet by a narrow gap, a coil, a stationary magnetizable core in the coil, mounting means for the magnetized part to permit it to move back and forth across the end of the core, the part having a normal position of balance at which substantially no flux is induced lengthwise of the core, the flux in the core being a combined function of the current in the coil and the movement of the said parts.

31. An electric pickup for phonograph records and the like comprising, a stationary magnet system having fixed spaced apart poles, a stylus operated vibratory member having magnetizable material carried between the poles but out of contact therewith, the parts being so disposed that the total length of air gap is unchanged, a coil, and a magnetizable core in the coil, the core being adjacent the vibratory magnetizable material and out of contact therewith.

32. An electric pickup for phonograph records and the like, comprising, a stationary magnet system having fixed spaced apart poles, a stylus operated vibratory member having magnetizable material carried between the poles but out of contact therewith, the parts being so disposed that the total length of air gap is unchanged, a coil, and a magnetizable core in the coil, the core being adjacent the vibratory magnetizable material and out of contact therewith, the core being disposed relative to the magnet system such that it normally receives substantially no flux therefrom.

33. An electrical pickup for phonograph records and the like comprising, a support, a permanent magnet carried thereby, the magnet having spaced pole tips adapted to accommodate an armature, a coil having a core adjacent the pole tips, and a stylus operated vibratory armature operating in the gap between the pole tips and in the gap between the pole tips and the core tip, and acting to vary the flux distribution in the core according to its position in the gap.

34. An electrical pickup for phonograph records and the like comprising, a current generating coil wound about a fixed core, a stationary magnet, and a stylus operated vibratory armature in the magnet field and adjacent the core, the core normally receiving no flux from the magnet but receiving varying flux according to the position of the armature when operated by the stylus whereby currents are generated in the coil.

35. An electrical pickup for phonograph records and the like, comprising, a stationary magnet system having pole tips spaced apart to provide a narrow air gap, a stationary core having one end adjacent the pole tips, an armature provided with magnetizable material disposed in the air gap and being close to the poles and the tip of the core, a pivotal mounting for the armature to permit it to move back and forth in the air gap, a stylus for actuating the armature, and a coil about the core in which currents are generated by vibrations imparted to the stylus.

WALTER H. SCHIMPF.